United States Patent [19]

Ury

[11] Patent Number: 5,171,609
[45] Date of Patent: Dec. 15, 1992

[54] FIBER CURING WITH FLUID FLOW

[75] Inventor: Michael G. Ury, Bethesda, Md.

[73] Assignee: Fusion Systems Corp., Rockville, Md.

[21] Appl. No.: 620,865

[22] Filed: Dec. 4, 1990

[51] Int. Cl.$^5$ .......................... B05D 3/06; B05D 5/06; C23C 16/00; B05C 11/00

[52] U.S. Cl. ...................................... 427/513; 427/163; 427/166; 427/521; 118/722; 118/50.1; 118/606

[58] Field of Search ........................ 427/53.1, 54.1, 55, 427/162, 163, 164, 165, 166, 167, 168, 169; 118/50.1, 620, 606, 722

[56] References Cited

U.S. PATENT DOCUMENTS

| | | |
|---|---|---|
| 3,213,827 | 10/1965 | Jenkin .................................. 118/725 |
| 4,107,391 | 8/1978 | Moore et al. ....................... 427/53.1 |
| 4,125,644 | 11/1978 | Ketley ................................ 427/54.1 |
| 4,309,241 | 1/1982 | Garavaglia et al. ................. 118/720 |
| 4,444,812 | 4/1984 | Gutsche ................................ 427/255 |
| 4,550,684 | 11/1985 | Mahawili .............................. 118/724 |
| 4,636,405 | 1/1987 | Mensah et al. ....................... 427/54.1 |
| 5,005,519 | 4/1991 | Egermeier et al. ................. 427/54.1 |
| 5,043,001 | 8/1991 | Cain et al. ............................ 118/405 |

Primary Examiner—Marianne Padgett
Attorney, Agent, or Firm—Pollock, Vande Sande & Priddy

[57] ABSTRACT

An inert ultraviolet light reaction chamber is provided with a flow of liquid on its light transmitting wall surface. The fluid prevents the build up of light blocking deposits, controls the temperature, and filters out undesired portions of the spectrum.

8 Claims, 4 Drawing Sheets

FIBER CURING WITH FLUID FLOW

FIELD OF THE INVENTION

The present invention is directed to an improved method and apparatus for curing photocurable coatings on fibers.

BACKGROUND OF THE INVENTION

In the last decade, fiber optic transmission lines have come into widespread use in the telecommunications industry. Fiber optics offer several advantages as opposed to copper wire including higher bandwidth, better resistance to harsh conditions, and less signal attenuation.

In the process for manufacturing fiber optics, the fiber, after being drawn from a heated preform is coated with a photocurable coating, and is then exposed to ultraviolet radiation to cure the coating.

The source which produces the ultraviolet radiation typically is comprised of at least one microwave powered or arc lamp discharge lamp positioned so as to irradiate the fiber as it is run through a housing. These lamps unavoidably produce such a large amount of heat that it is necessary to cool the housing and/or the lamp bulb with forced air or a liquid coolant. A transparent chamber defines a space in the housing through which the fiber is passed. The chamber serves to contain an atmosphere which is inert with respect to the coating on the fiber, and also shields the fiber from the vigorously circulated lamp coolant.

A problem which is encountered with arrangements of the type described above is that heat or infrared radiation generated by the lamp causes coating material to be evaporated from the fiber, which is deposited on the wall of the transparent chamber, thus darkening it.

Japanese laid open Patent 55-152567 discloses an ultraviolet light source for curing a coating on a fiber. The light source includes a quartz tube as a chamber which contains an inert atmosphere of nitrogen gas through which the fiber is passed. As described above, an apparatus of this type has the defect that coating material evaporated from the fiber tends to deposit on the inside of the tube, and thereby reduces the amount of light reaching the fiber. Industrial practice is to replace the tube after each shift but there remains the problem that the light reaching the fiber diminishes as the line is run. There is also a problem that the temperature of the fiber as it is running through the light source is too high and not easily controlled. This is caused by the bombardment of the fiber by infrared radiation which is unavoidably produced by arc lamps and microwave lamps used in fiber curing apparatus. The problem of excessive heating aggravates the problem of light blocking deposits on the tube since the rate of evaporation of coating from the fiber increases with temperature.

U.S. Pat. No. 4,636,405 to Mensah et al. discloses the use of a double walled tube through which an infrared absorbing fluid is circulated. The circulating fluid is provided to lower the temperature in the chamber. However, coating material evaporated from the fiber is not prevented from settling on the inside of the tube and diminishing the light that reaches the fiber. Additionally, the double walled tube is a custom made glass piece, which is relatively expensive.

The problem of fiber overheating becomes worse at low line speeds. In this case the dwell time of the fiber in the chamber is longer, and thus the coating which it bears is subject to more heating, which causes more evaporation and deposits on the chamber wall.

SUMMARY OF THE INVENTION

It is thus the object of the present invention to provide a fiber curing method and apparatus wherein evaporated coating is prevented from depositing on the inside wall of the transparent chamber through which the fiber is passed.

In accordance with the present invention, the above object is accomplished by flowing a fluid on the inside surface of the transparent chamber wall. This fluid, which in the preferred embodiment of the invention, is a liquid, forms a barrier, and prevents any coating which is evaporated from reaching the chamber wall. Additionally, the fluid is selected so that it absorbs infrared energy, thus preventing overheating of the fiber and the resultant evaporation of coating.

BRIEF DESCRIPTION OF THE FIGURES

The invention will be better understood by referring to the accompanying drawings, wherein.

DESCRIPTION OF PREFERRED EMBODIMENT

Figure 1:
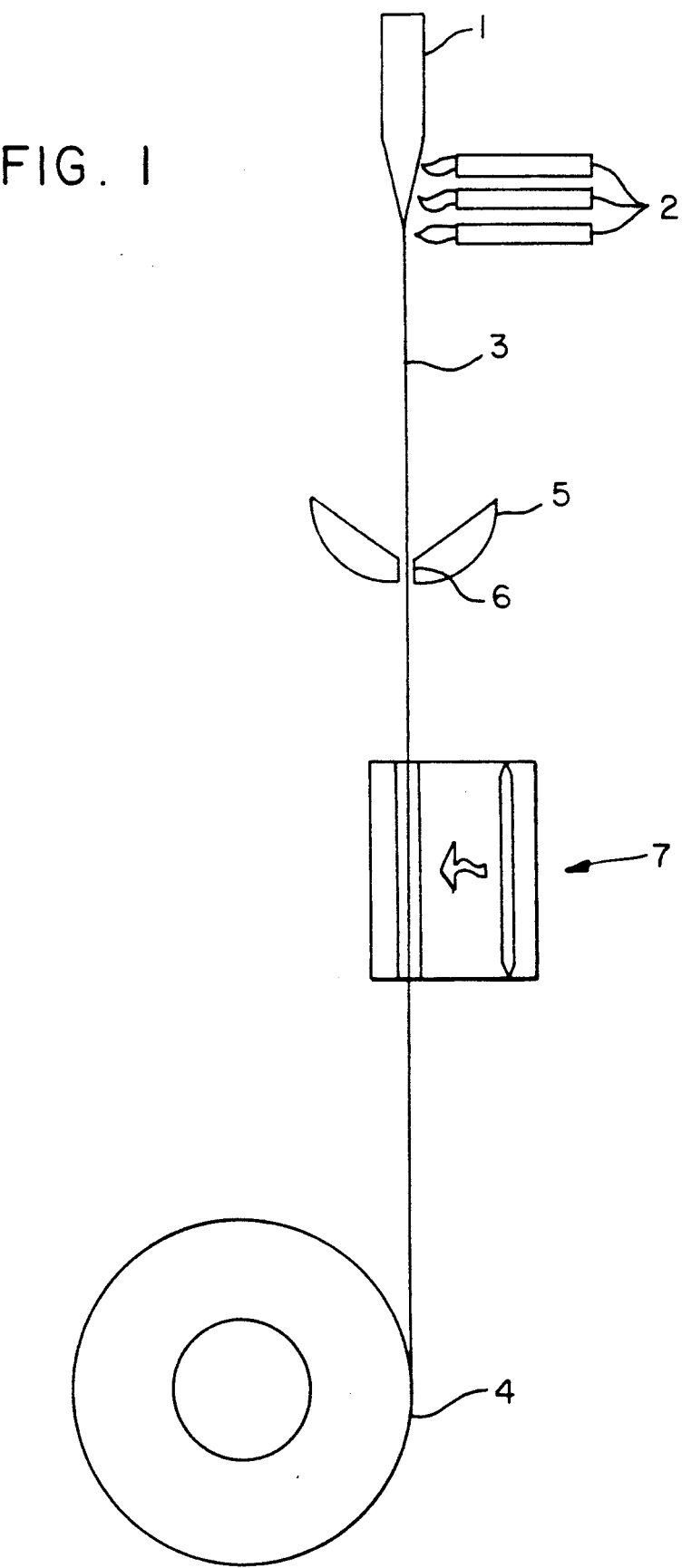
FIG. 1 is a schematic drawing of a typical industrial system for manufacturing fiber optics.

Referring to FIG. 1, an elementary apparatus for the manufacture of fiber optics is shown. The fiber is first drawn from heated preform 1. The heater 2 may be a gas torch or an induction heated susceptor. During the manufacture, the fiber 3 is constantly being drawn from the preform 1, and continues through the successive processing stations before being wound onto spool 4.

Immediately following the drawing of the fiber, it is fed through a coating cup 5. The coating cup 5 is filled with a photopolymerizable coating mixture. A special seal 6 which may be of the capillary type insures that the fiber is coated with the desired thickness of coating and that the coating does not leak from the cup.

Figure 2:
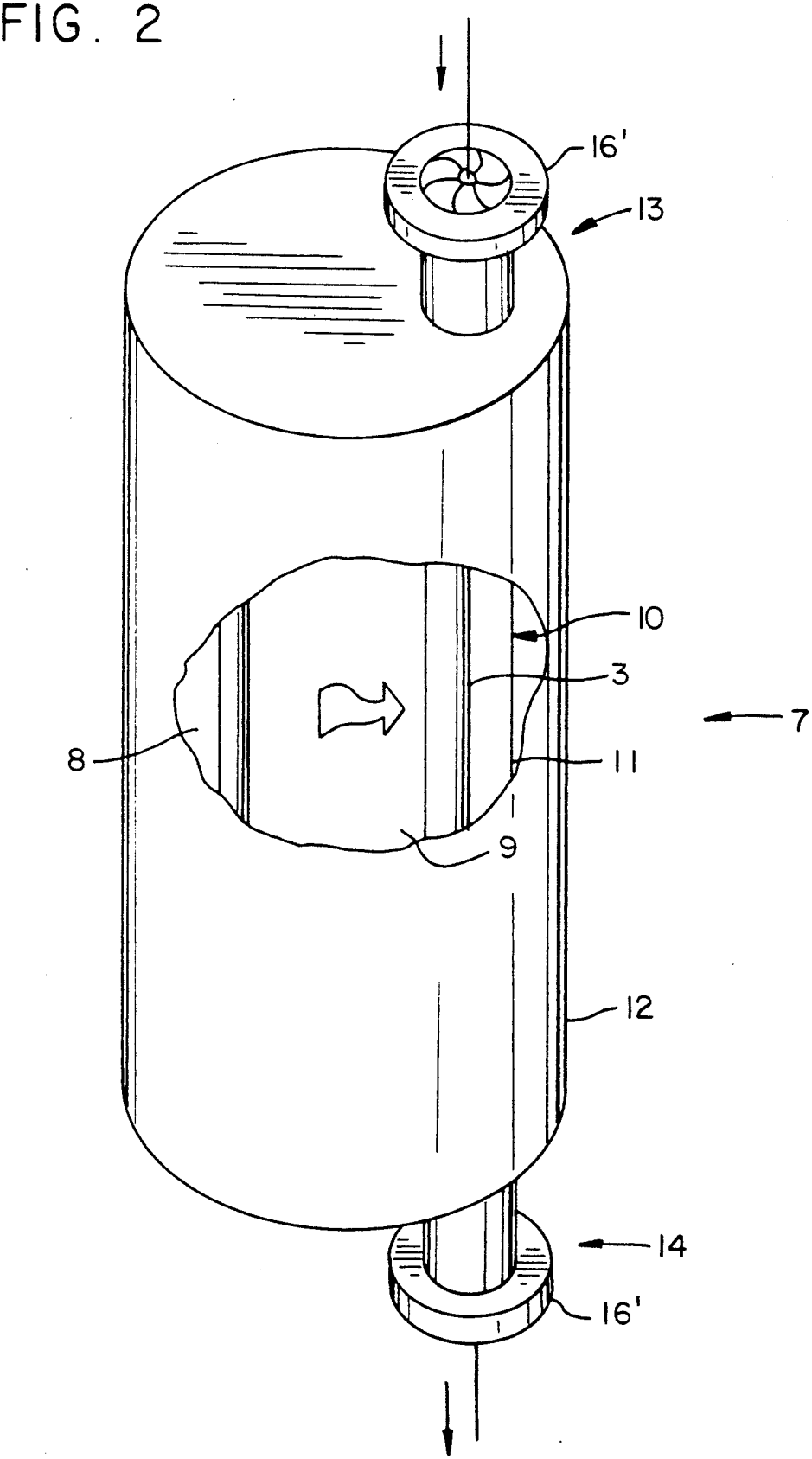
FIG. 2 shows a curing apparatus in accordance with an embedment of the invention.

Following the coating cup, the fiber 3 is fed through an ultraviolet light source 7 in order to photopolymerize the coating. As shown in FIG. 2, the light source 7 is comprised of a microwave powered electrodeless lamp bulb 8, an internally reflective cylinder 9, and a reaction chamber 10. The reflective cylinder 9 may be approximately elliptical in cross section so that light produced by the bulb impinges on the reaction chamber 10 and the fiber 3 from all directions. The reflector 9 may be formed in two parts—one of which holds the bulb 8 and the other of which holds the reaction chamber 10. Microwave lamp technology is well known in the art; additionally, the light source 7 could be an arc lamp, which technology is also well known.

Figure 3:
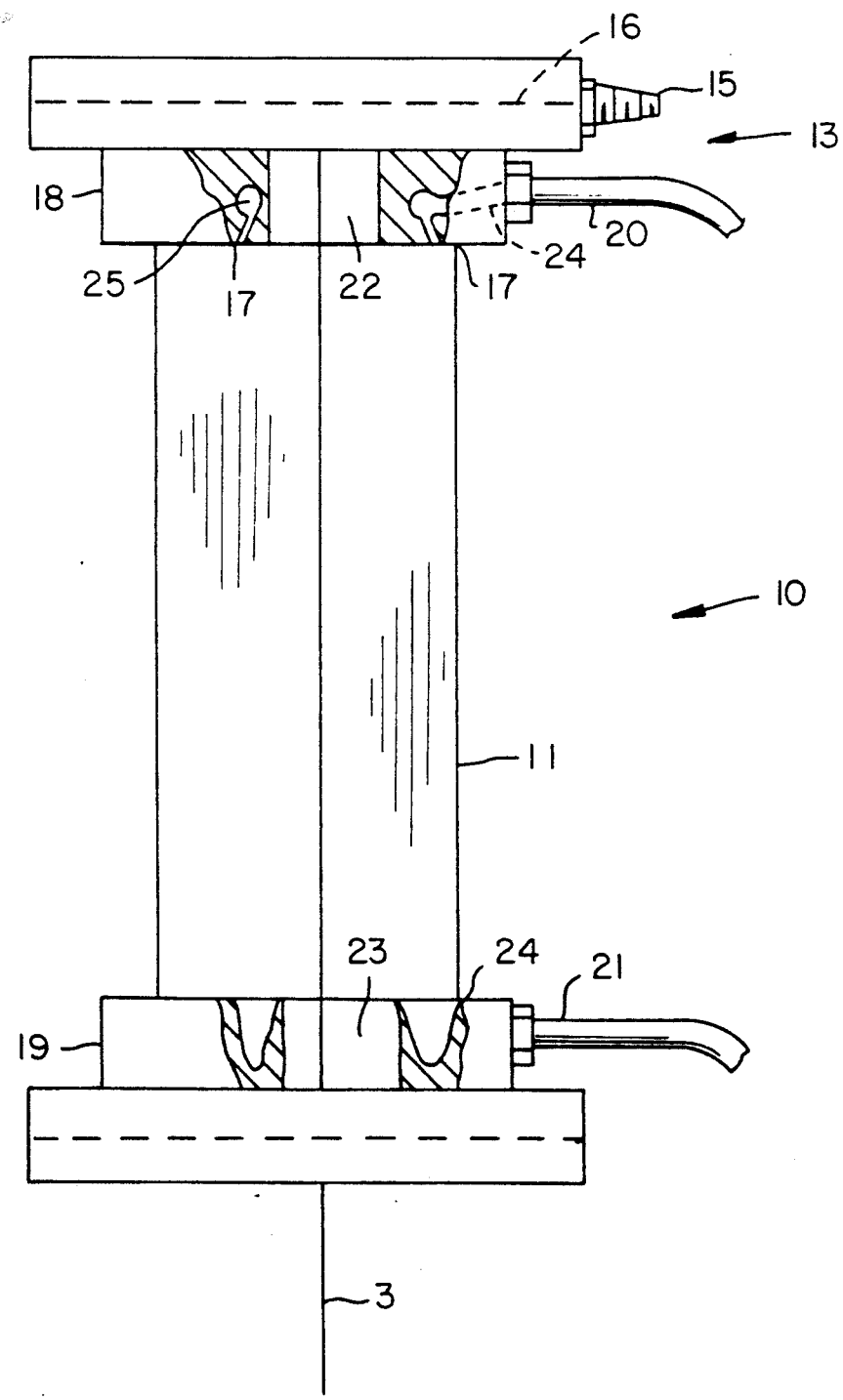
FIG. 3 shows a reaction chamber which is made in accordance with an embodiment of the invention.

The reaction chamber 10 is comprised of a tube 11 of quartz, sapphire, or other material which transmits at least the portion of the spectrum that is used to cure the coating material. Disposed at either end of the quartz tube 11, mounted to the light source housing 12 is an assembly 13, 14 which holds the tube 11. Referring to FIG. 3, it is seen that the assembly 13 has a pipe fitting 15 to be used for intake or exhaust of inert gas and an iris 16 which can be closed around the fiber to limit the nitrogen leaking out of the system.

In accordance with the invention, a ring of fluid supply bores 17 is provided on an annular sparger 18 located in the assembly 13 on the top end of the tube 11. The fiber 3 is passed through the assembly body 13, through the sparger 18, and into the reaction chamber 10. The individual jets 17 of the sparger are angled so that the liquid which they spray into the chamber tube 10 has a radial component, an angular component and an axial component. This multi component (with respect to the tube) velocity is intended to form a relatively even, unbroken layer of water all around and down the length of the tube.

Within the lower assembly 14 an annular trough 19 is provided to collect the water after it has come through the tube 11. The trough 19 will be shaped so as to collect the water without it splashing or overflowing.

The trough 19 and the sparger 18 are connected to a fluid inlet 20 and 21. These may be connected to a closed or open fluid circulation system (not shown). The system may comprise a heat exchanger, a filtering system and intake and exhaust pumps.

In operation, a fiber 3 being manufactured runs through tube 11 which contains an inert nitrogen atmosphere which is provided by flowing the gas into the chamber through the pipe fitting 15 located on the iris assemblies 16, and venting it out through the bottom of the tube. Additionally, fluid is supplied through a pipe 20 to the annular sparger 18 located at the top of the chamber. In the annular sparger, the fluid is conducted through a radial bore 24 to an annular distribution pipe 25. Small bores 17, preferably from ten to one hundred in number are made from the bottom of sparger 18 to the annular distribution pipe 25. The jets of water emanating from the sparger impinge on the quartz tube 11 with an angle and velocity such that they form a circumferentially and axially continuous stream of water. The annular flow of water on the inside of the tube 11 allows the fiber 3 to run coolly even when it is run at reduced speed and allows the tube 11 to be used without having to replace it due to the build up of light blocking deposits.

At the bottom of the chamber 10 an annular trough 19 is positioned to collect the water. The trough 19 is designed so that the top of its outermost side 26 matches the chamber tube, i.e., for a round tube 11 the radius of the top of the outermost side of the trough 26 is equal to the inner radius of the tube 11. The trough 19 is also designed so that the top of the outermost side 26 which is juxtaposed to the tube 11 is tangent to the tube 11 so that the flow transition from the tube 11 to the trough 19 will not be abrupt.

The fluid which is circulated over the chamber wall is selected based on a number of criteria. First, the radiation absorption spectrum of the fluid is taken into consideration, so that the spectrum produced by the light source can be selectively transmitted to the fiber coating. For instance, infrared radiation which has the effect of overheating the fiber can be blocked by using water as the fluid. It may also be desirable to provide a fluid with additives that block other portions of the spectrum such as deep ultraviolet. The deep ultraviolet may have deleterious effects on the fiber and/or coating.

Additionally, the heat capacity of the fluid is taken into account. A large heat capacity will enable the curing temperature to be determined by the temperature of the fluid, if enough fluid is circulated. The chemical activity of the fluid is also taken into account. Generally, it is desired to use a fluid that does not decompose under high intensity ultraviolet or react with the coating composition.

The ability of the fluid to wash away or absorb evaporated coating in the chamber is also considered, as a feature of the invention is that the fluid prevents light blocking deposits of evaporated coating from appearing on the inside of the cavity.

Furthermore, the ability of the fluid to wet the inside of the tube is taken into consideration. In this interest, a wetting agent could be added to the fluid to decrease the wetting angle, which enables the fluid to adhere to and cover the inside of the inert gas chamber.

Water may be used as the fluid, as it has a high thermal capacity, it absorbs significantly in the infrared portion of the spectrum, it is inert with respect to the coating used on fibers, it prevents deposits on the reaction chamber wall, and it wets the inside of the quartz tube.

It is contemplated that other fluids and/or fluids with other additives may be used so long as they meet at least some of the criteria set forth above.

Figure 4:
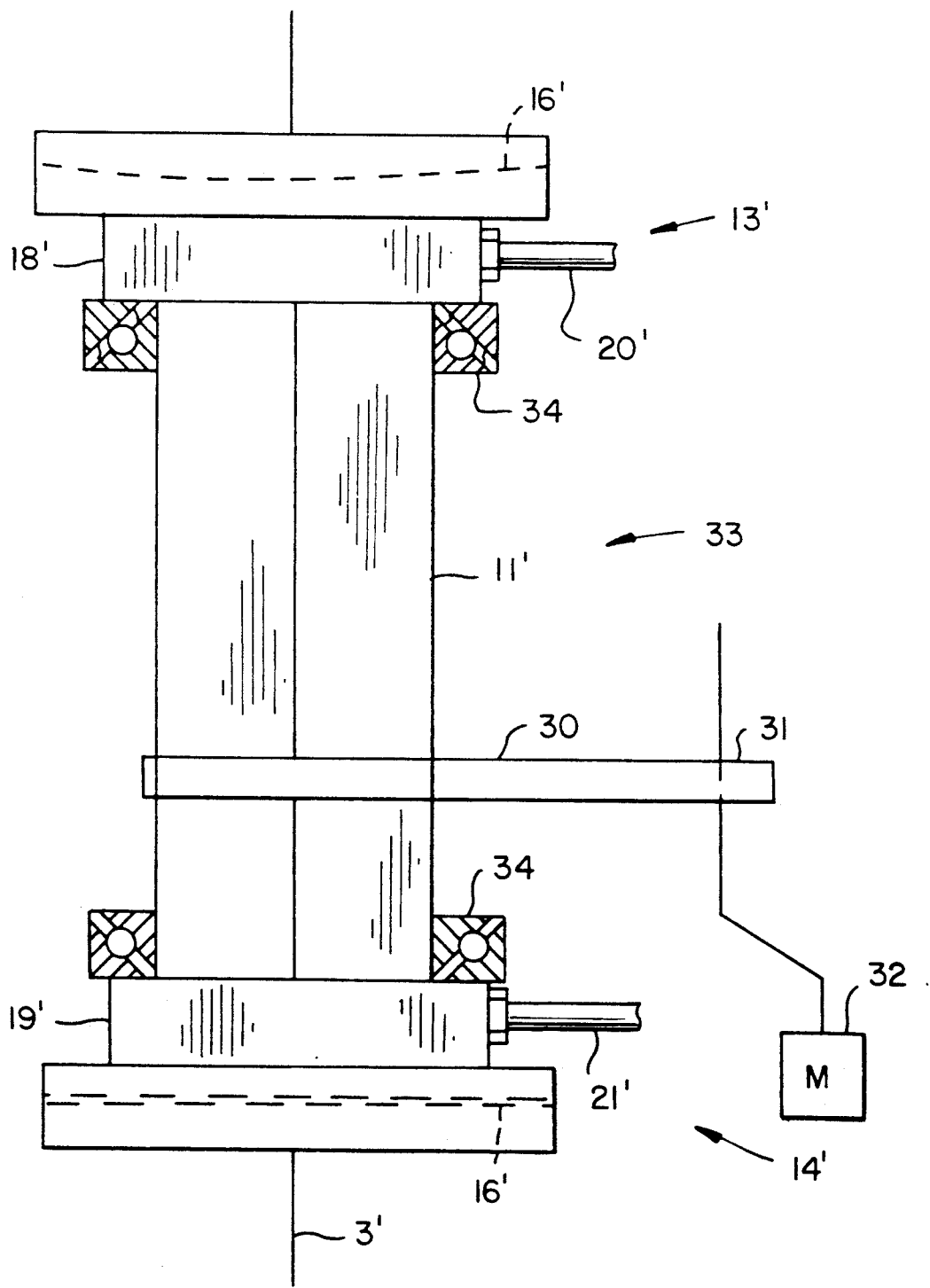
FIG. 4 shows a reaction chamber having a rotation feature.

Referring to FIG. 4, which is similar to FIG. 3, and wherein like parts are identified with the same reference numerals, a further embodiment of the invention is shown.

In this embodiment, quartz tube 11' is attached to the end assemblies by means such as sealed bearings 34, so that the tube can be rotated. The reason for rotating the tube will now be explained. The fluid, according to this invention, is made to enter the chamber 33 through jets equally spaced around its circumference. However the internal cohesion of the water tends to localize the fluid flow so that certain regions of the tube are exposed. By spinning the tube, a centrifugal force on the water is created, which tends to counteract the cohesion of the water so that it covers the entire circumference of the tube.

As an example, the tube 11' may be rotated by a small elastic belt 30 which is wrapped around it and a driven pulley 31. The pulley may be driven by a fractional electric motor 32.

Rotation of the tube 11 would be merited as an additional measure if the tube were so long and/or if the fluid is so cohesive that it is difficult to maintain unbroken flow coverage of the tube. It is important that the tube be rotated in the same direction as the angular direction of fluid jets of the annular sparger so that the angular velocity of the fluid is increased rather than decreased by rotation.

Thus, a method and apparatus have been disclosed which are effective to maintain transparency of the reaction chamber wall in a fiber curing system.

It should be appreciated that while the invention has been disclosed in connection with an illustrative embodiment, variations will occur to those skilled in the art, and the scope of the invention is to be limited only by the claims appended hereto and equivalents.

I claim:

1. A method of curing a fiber having photocurable coating disposed on the surface thereof, comprising the steps of, passing the fiber through a single-walled chamber having a transparent wall, the inside surface of the transparent chamber wall being arranged to face the fiber and there being no solid material between the inside surface of the chamber wall and the fiber, the chamber having a top and bottom, irradiating the fiber through the transparent wall with radiant energy, and passing a liquid along the inside surface of the chamber wall in the direction from the top of the chamber to the bottom thereof.

2. The method of claim 1 wherein the liquid is heat-absorbing, and is passed along substantially the entire inside surface of the chamber wall.

3. The method of claim 2 wherein the chamber is cylindrical in shape, further including the step of rotating the cylindrical chamber.

4. The method of claim 1 further including the step of rotating the chamber.

5. An apparatus for curing a fiber having a photocurable coating disposed on the surface thereof, comprising:

a single-walled chamber having a transparent wall, the chamber having a top and bottom, means for passing the fiber to be cued through the chamber, there being no solid material between the inside of the chamber wall and the fiber, means for irradiating the fiber through the chamber wall with radiant energy, and means for passing a liquid along the inside of the chamber wall in the direction from the top of the chamber to the bottom thereof.

6. The apparatus of claim 5 wherein said means for passing a liquid along the inside of the chamber wall is arranged so that the liquid covers substantially the entire inside chamber wall.

7. The apparatus of claim 6 wherein said chamber comprises a cylinder, further including means for rotating the cylindrical chamber.

8. The apparatus of claim 5, further comprising means for rotating the chamber.

* * * * *